United States Patent
Cho et al.

(10) Patent No.: US 9,669,547 B2
(45) Date of Patent: Jun. 6, 2017

(54) METHOD FOR TESTING FEEDING FUEL CELL STACK AND APPARATUS FOR PRODUCING FUEL CELL STACK USING THE SAME

(71) Applicants: HYUNDAI MOTOR COMPANY, Seoul (KR); Kia Motors Corporation, Seoul (KR)

(72) Inventors: Sang Hyun Cho, Hwaseong-si (KR); Joook Park, Ulsan (KR); Nam Gu Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/559,758

(22) Filed: Dec. 3, 2014

(65) Prior Publication Data
US 2016/0087298 A1 Mar. 24, 2016

(30) Foreign Application Priority Data
Sep. 22, 2014 (KR) .................. 10-2014-0126189

(51) Int. Cl.
| | |
|---|---|
| *H01M 8/24* | (2016.01) |
| *H01M 8/1004* | (2016.01) |
| *B25J 9/16* | (2006.01) |
| *H01M 8/241* | (2016.01) |
| *H01M 8/1018* | (2016.01) |

(52) U.S. Cl.
CPC ........... *B25J 9/1694* (2013.01); *H01M 8/241* (2013.01); *H01M 2008/1095* (2013.01); *Y02P 70/56* (2015.11); *Y10S 901/09* (2013.01)

(58) Field of Classification Search
CPC ..... Y02P 70/56; H01M 8/241; H01M 8/1004; H01M 8/2428; H01M 8/2425; H01M 8/24; H01M 2008/1095; Y10S 901/09
See application file for complete search history.

(56) References Cited

U.S. PATENT DOCUMENTS

2003/0188413 A1* 10/2003 Mlinar ................ H01M 8/2465
29/411
2006/0127732 A1* 6/2006 Yoshida .................. H01M 8/00
29/623.1
(Continued)

FOREIGN PATENT DOCUMENTS

| JP | 2008-234906 A | 10/2008 |
|---|---|---|
| KR | 2009-0108492 A | 10/2009 |

(Continued)

*Primary Examiner* — Patrick Ryan
*Assistant Examiner* — Kiran Akhtar
(74) *Attorney, Agent, or Firm* — McDermott Will & Emery LLP

(57) ABSTRACT

A producing method of a fuel cell stack includes a transfer robot configured to clamp and to transfer a membrane electrode assembly (MEA) and a gas diffusion layer (GDL) component. A feeding testing unit is configured to check a stacked status of the MEA and the GDL component while the MEA and the GDL component are transferred and stacked by the transfer robot. A control unit is configured to receive a signal of the feeding test unit and to transmit an error signal when it is determined that the MEA and the GDL component are erroneously stacked.

2 Claims, 7 Drawing Sheets

(56) References Cited

U.S. PATENT DOCUMENTS

| | | | |
|---|---|---|---|
| 2007/0116999 A1* | 5/2007 | Kuramochi | B32B 37/223 429/469 |
| 2007/0154628 A1* | 7/2007 | Fujiki | H01M 8/0284 427/115 |
| 2009/0271023 A1* | 10/2009 | Lee | H01M 8/023 700/159 |
| 2012/0078481 A1* | 3/2012 | Aldrich, III | B60L 7/10 701/70 |
| 2012/0321986 A1* | 12/2012 | Mekala | H01M 4/8828 429/469 |
| 2013/0204422 A1* | 8/2013 | Ross | B21D 31/04 700/117 |

FOREIGN PATENT DOCUMENTS

| | | |
|---|---|---|
| KR | 2009-0111898 A | 10/2009 |
| KR | 2014-0024704 A | 3/2014 |

* cited by examiner

METHOD FOR TESTING FEEDING FUEL CELL STACK AND APPARATUS FOR PRODUCING FUEL CELL STACK USING THE SAME

CROSS-REFERENCE TO RELATED APPLICATION

This application claims the benefit of priority to Korean Patent Application No. 10-2014-0126189 filed in the Korean Intellectual Property Office on Sep. 22, 2014, the entire contents of which are incorporated herein by reference.

TECHNICAL FIELD

The present disclosure relates to a method for testing a feeding fuel cell stack and an apparatus for producing a fuel cell stack which may improve production quality of a fuel cell stack.

BACKGROUND

An automated feeding technology has been developed to provide correct quality and performance of a fuel cell. When 1000 sheets or more of electrochemical materials having large mechanical properties and a large tolerance deviation are stacked in series during a process of feeding a fuel cell stack, the feeding maintains a final alignment between the stacked materials with a flatness difference of 1.5 mm or less.

When the alignment of the fed fuel cell stacks deviates, the fuel cell performance deteriorates, and a fuel cell vehicle may not operate.

Therefore, the alignment between the stacked materials during the process of producing the fuel cell stack needs to be tested, and an automatic alignment is necessary to improve accuracy of the fuel cell stack production.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a method for testing feeding a fuel cell stack which allows materials to be correctly stacked and aligned in a production process of the fuel cell stack, and an apparatus for producing the fuel cell stack using the same.

According to an exemplary embodiment of the present inventive concept, an apparatus for producing a fuel cell stack includes a transfer robot which clamps and transfers a membrane electrode assembly (MEA) and a gas diffusion layer (GDL) component. A feeding testing unit configured to check a stack status of the MEA and the GDL component while the MEA and the GDL component are transferred and stacked by the transfer robot. A control unit configured to receive a signal of the feeding testing unit and transmits an error signal when it is determined that the MEA and the GDL component are erroneously stacked.

An MEA supply unit may supply the MEA and a GDL supply unit may supply the GDL component. The transfer robot may include a first robot configured to pick up the MEA of the MEA supply unit and the GDL component of the GDL supply unit to insert the MEA and the GDL component in a working region of a hot press. A second robot is configured to pick up an integrated component which is treated in the hot press to transfer the integrated component to a trimming press.

The GDL supply unit may include a first GDL supply unit which supplies a first GDL component to the hot press. A second GDL supply unit supplies a second GDL component to the hot press with the MEA between the first GDL supply unit and the second GDL supply unit.

The feeding test unit may include a first test unit which is disposed between the first robot and the hot press. A second test unit is provided between the hot press and the second robot.

The first test unit may include a test table which is provided between the hot press and the first GDL supply unit and in which the MEA and the first GDL component are securely disposed by the first robot. A light emitting unit emits light onto the test table. A light receiving unit is disposed inside the test table to receive the light which passes through the MEA and the first GDL component. A controller is configured to receive a light receiving signal sensed by the light receiving unit to transmit a signal checking for an error to the control unit.

The second test unit may include a test table which is disposed between the hot press and the second GDL supply unit and in which the second GDL component is securely disposed above a position where the first GDL component and the MEA are stacked by the second robot. A light emitting unit emits light onto the test table. A light receiving unit is provided inside the test table to receive the light which passes through an object to be measured. A controller is configured to receive a light receiving signal detected by the light receiving unit and to transmit a signal for checking whether there is an error to the control unit.

A plurality of light receiving units may be provided to receive the light inside the test table. The plurality of light receiving units may include a sensor table provided inside the test table. A photo sensor is provided inside the sensor case. A sensor line is provided in the sensor case to transmit a sensing signal of the photo sensor.

The control unit may sequentially perform steps of: (a) checking a received light amount of the plurality of light receiving units through the controller; (b) measuring values of the received light amount by the light receiving units to plot a linear graph using the measured values; (c) checking a slope of the linear graph to determine a position of an inflection point where the slope becomes infinity; (d) checking a position of the photo sensor which outputs a received light amount signal in a portion corresponding to the inflection point; (e) setting a portion where the photo sensor is vertically disposed as an edge where the MEA and the GDL components are stacked; and (f) determining that the MEA and the GDL component are erroneously stacked to output an error signal when the edge is out of a predetermined range.

According to another exemplary embodiment of the present inventive concept, a method of producing a fuel cell stack includes: (a) aligning by securely disposing an MEA and a GDL component of the fuel cell stack in a secure displacement unit set in a test table; (b) emitting light through a light emitting unit provided above the alignment of the MEA and the GDL component; (c) receiving the light which passes through the MEA and the GDL component through a plurality of light receiving units; (d) checking a received light amount determine whether the received light amount is out of a predetermined value; and (e) determining a position of the light receiving unit where the light is erroneously received to check the erroneous alignment position of the MEA and the GDL component when it is determined that the received light amount is out of the predetermined value in step (d) and outputting an error signal.

In the step (c), the light receiving units may include a plurality of photo sensors which are provided along the edge of the secure displacement unit.

The step (e) may include: (e-1) plotting a linear graph using the received light amounts of the photo sensors; (e-2) checking a slope of the linear graph to determine an inflection point where the slope becomes infinity; (e-3) checking a position of the photo sensors corresponding to a position of the inflection point in step (e-2; (e-4) setting a portion where the photo sensors are vertically disposed as an edge where the MEAs and the GDL components are stacked; and (e-5) determining that the MEA and the GDL component are erroneously stacked when the edge is out of a predetermined range in step (e-4) and outputting an error signal.

According to the exemplary embodiment of the present inventive concept, when it is checked whether the MEAs and the GDL components are stacked normally, and an erroneously stacked status is determined, it is possible to promptly perform a countermeasure operation for the error, thereby improving operating efficiency for producing the fuel cell stack.

According to another exemplary embodiment of the present inventive concept, it is possible to precisely determine whether the MEA and the GDL component are stacked normally using a light emitting unit and a light receiving unit in accordance with a light receiving status, thereby improving quality for producing the fuel cell stack.

DETAILED DESCRIPTION OF THE EMBODIMENTS

Figure 1:
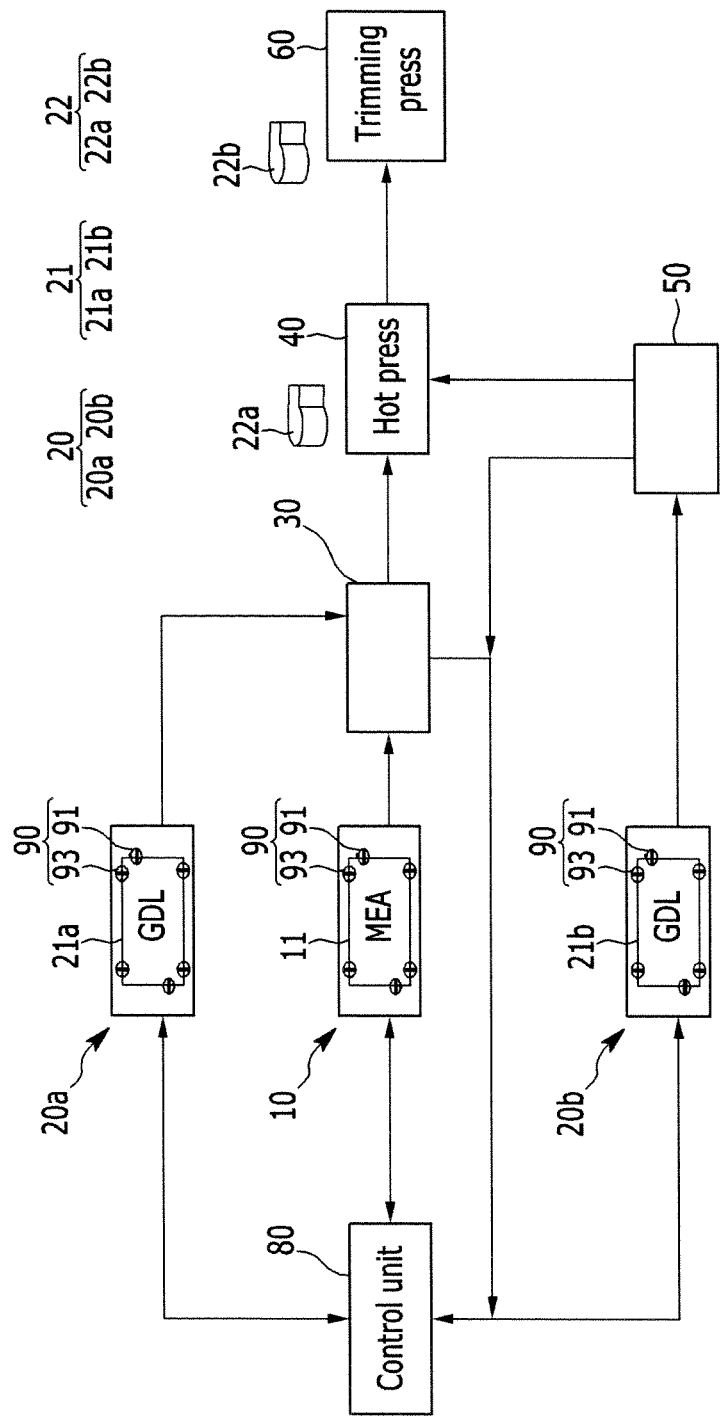
FIG. 1 is a perspective view schematically illustrating an apparatus for producing a fuel cell stack according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept. The drawings and description are to be regarded as illustrative in nature and not restrictive. Like reference numerals designate like elements throughout the specification.

FIG. 1 is a perspective view schematically illustrating an apparatus for producing a fuel cell stack according to an exemplary embodiment of the present inventive concept.

As illustrated in FIG. 1, the apparatus for producing a fuel cell stack according to an exemplary embodiment of the present inventive concept includes a membrane electrode assembly (MEA) supply unit 10 for supplying an MEA 11 which is stacked. A gas diffusion layer (GDL) supply unit 20 is disposed at one side of the MEA supply unit 10 and supplies GDL components 21. A hot press 40 presses the stacked MEA 11 and the GDL components 21 at a high temperature and a high pressure to form an integrated component. A trimming press 60 cuts the integrated component bonded by the hot press 40 to have a predetermined size. A transfer robot 22 transfers the MEA 11 of the MEA supply unit 10 and the GDL components 21 of the GDL supply unit 20. Feeding test units 30 and 50 check an alignment status of the MEA 11 and the GDL components 21 while the MEA 11 and the GDL component 21 are transferred and stacked by the transfer robot 22. A control unit 80 is configured to receive signals from the feeding test units 30 and 50 and to transmit an error signal when an alignment error of the MEA 11 and the GDL component 21 is determined.

The MEA supply unit 10 supplies the MEA 11 and further sequentially supplies upper MEAs 11 when MEAs 11 are stacked. That is, whenever one of the stacked MEAs 11 is drawn out, the remaining MEAs are raised up by one step to continuously supply the MEAs 11.

The GDL supply unit 20 supplies the GDL components 21 which are stacked, and further sequentially supplies the stacked GDL components 21. That is, whenever one of the GDL components 21 is drawn out, the remaining GDA components 21 are raised up by one step to continuously supply the GDA components 21.

According to the present disclosure, the GDL supply unit 20 may include a first GDL supply unit 20a which supplies a first GDL component 21a to the hot press 40, and a second GDL supply unit 20b which supplies a second GDL component 21b to the hot press 40 with the MEA 11 between the first GDL supply unit 20a and the second GDL supply unit 20b. Here, the first GDL component 21a is stacked in a lower part of the integrated component, and the second GDL component 21b is stacked in an upper part of the integrated component.

The first GDL supply unit 20a is disposed between the MEA supply unit 10 and the hot press 40 to supply the first GDL component 21a to the hot press 40. The second GDL supply unit 20b is disposed between the hot press 40 and the trimming press 60 to supply the second GDL component 21b to the hot press 40.

The above-described MEA supply unit 10 and GDL supply unit 20 may include a lifting plate (not shown) which feeds the MEA 11 and the GDL component 21, and a driving unit (not shown) which lifts the lifting plate up and down. Therefore, as the lifting plate is sequentially lifted by driving the driving unit, the MEA 11 or the GDL component 21 may be sequentially supplied. More specific configuration of the GDL supply unit 20 and the MEA supply unit 10 is already known so that the description thereof will be omitted.

The hot press 40 may press the sequentially stacked MEAs 11 and GDL components 21 at a high temperature and a high pressure to be integrated. That is, the hot press 40 operates in a state where the MEAs 11 and the GDL components 21 are stacked in a mold in accordance with a feeding order to perform the high temperature and high pressure integrating process.

According to the present disclosure, two hot presses 40 may be provided to be adjacent to each other so that the integration press processing of the MEAs 11 and the GDL components 21 may be performed in two places.

The MEAs 11 and the GDL components 21 are transferred from the MEA supply unit 10 and the GDL supply unit 20 to the hot press 40 by the transfer robot 22, which will be more specifically described when the transfer robot 22 is described.

The integrated component formed by pressing the MEA 11 and the GDL component 21 by the hot press 40 is transferred to the trimming press 60 to have an appropriate size.

A press mold (not shown) in which the integrated component is securely disposed is provided in the trimming press 60 to have an appropriate size of the integrated component. As a driving and cutting method which cuts the integrated component to have an appropriate size by operating the trimming press 60, a method which is generally known in the art will be employed without being specifically limited.

The MEAs 11 and the GDL components 21 may be transferred by a plurality of transfer robots 22.

The transfer robots 22 may include a first robot 22a which picks up the MEA 11 of the MEA supply unit 10 and the GDL component 21 of the GDL supply unit 20 to insert the MEA 11 and the GDL component 21 into a working region of the hot press, and a second robot 22b which picks up the integrated component from the hot press 40 to the trimming press 60.

The first robot 22a picks up the first GDL component 21a, which is provided from the first GDL supply unit 20, and then transfers to the hot press 40. The first robot 22a receives the MEAs 11 from the MEA supply unit 10 to feed the MEAs above the first GDL component 21a in the hot press 40.

The second robot 22b is disposed between the hot press 40 and the trimming press 60 to feed the second GDL component 21 above the MEA 11 in the hot press 40. The second robot 22b may transfer the integrated component formed by pressing the first GDL component 21a, the MEA 11, and the second GDL component 21b in the hot press 40 to the trimming press 60.

The above-described first robot 22a and second robot 22b may transfer the first GDL component 21a, the MEA 11, and the second GDL component 21b to the feeding test units 30 and 50 to check the stacked a status in the process of transferring the first GDL component 21a, the MEA 11, and the second GDL component 21b to the hot press 40.

Figure 2:
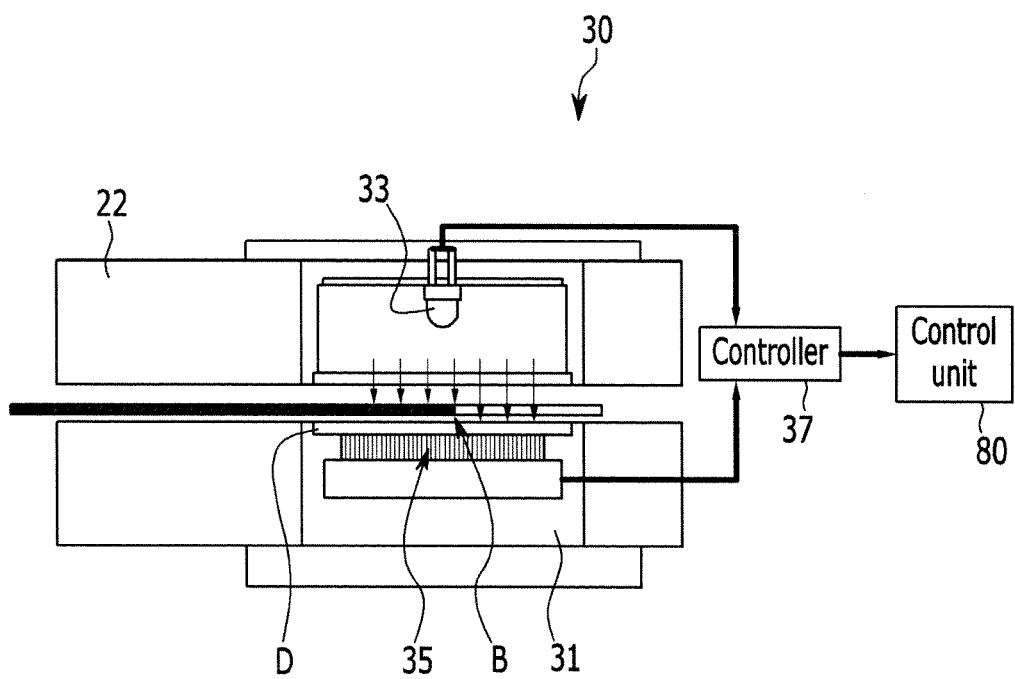
FIG. 2 is a side view schematically illustrating a feeding test unit according to an exemplary embodiment of the present inventive concept.
Figure 3:
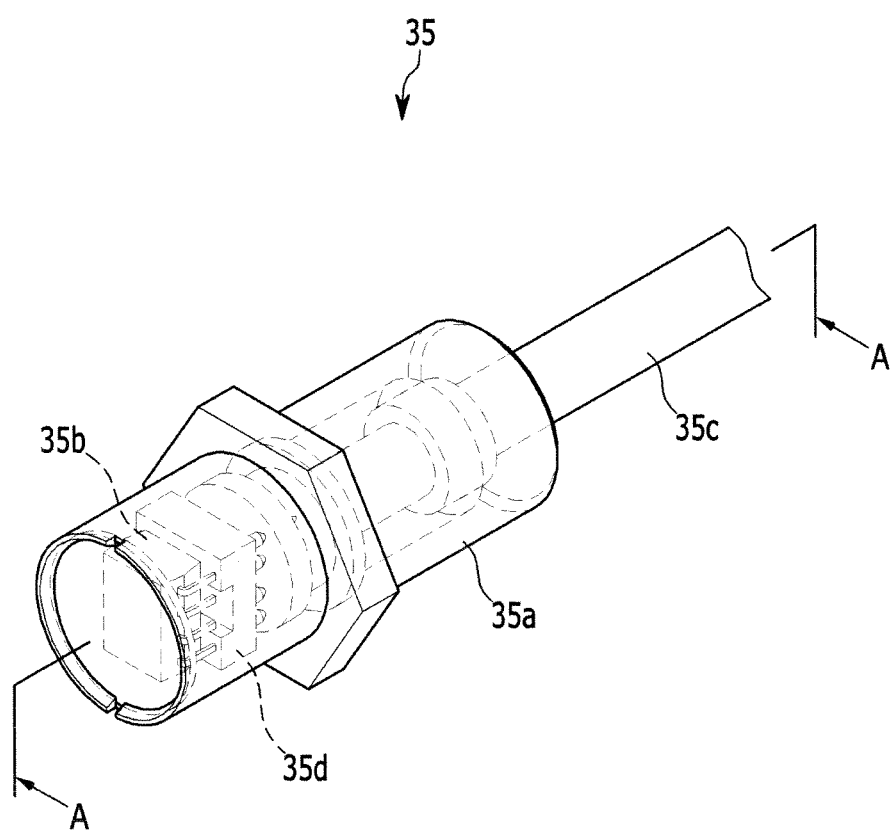
FIG. 3 is a perspective view schematically illustrating a light receiving unit provided in the feeding test unit of FIG. 2.
Figure 4:
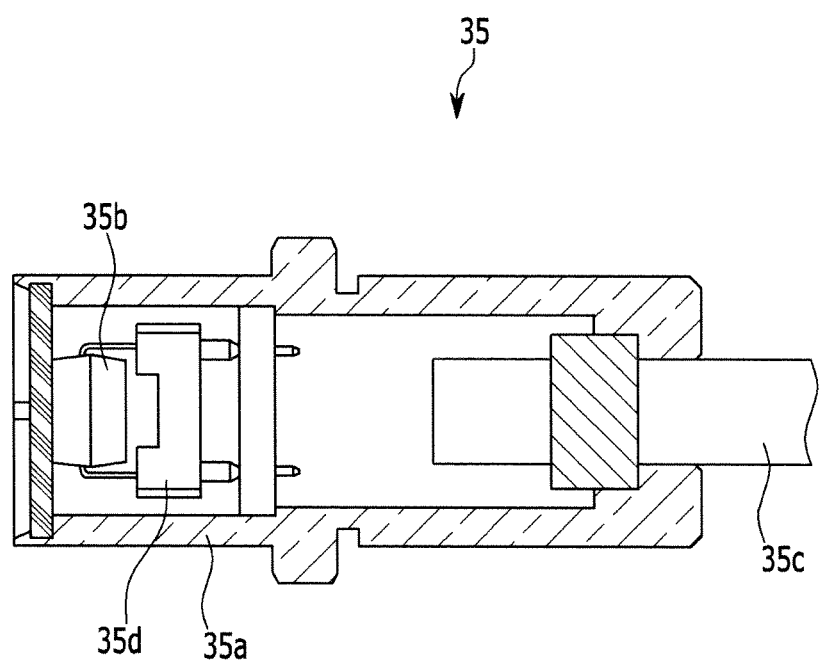
FIG. 4 is a cross-sectional view taken along the line A-A of FIG. 3.

FIG. 2 is a side view schematically illustrating a feeding test unit according to an exemplary embodiment of the present inventive concept. FIG. 3 is a perspective view schematically illustrating a light receiving unit provided in the feeding test unit of FIG. 2, and FIG. 4 is a cross-sectional view taken along the line A-A of FIG. 3.

As illustrated in FIGS. 1 to 4, the feeding test units 30 and 50 include a first test unit 30 which is provided between the first robot 22a and the hot press 40, and a second test unit 50 which is provided between the hot press 40 and the second robot 22b.

The first test unit 30 may include a test table 31 which is provided between the hot press 40 and the first GDL supply unit 20 so that the MEA 11 and the first GDL component 21a are securely disposed therein by the first robot 22a. a light emitting unit 33 emits light onto the test table 31. A light receiving unit 35 receives light which is disposed on the test table 31 to receive light which passes through the MEA 11 and the first GDL component 218. A controller 37 receives a light receiving signal sensed by the light receiving unit 35 and checks whether there is an error in the light receiving signal to transmit the light receiving signal to the control unit 80.

The test table 31 may be provided between the hot press 40 and the first GDL supply unit 20. In the test table 31, the MEA 11 and the first GDL component 21a may be securely disposed while being controlled by the first robot 22a. As described above, the MEA 11 and the first GDL component 21a are securely disposed on the test table 31 in order to check whether there is an error in a stacked status of the MEA 11 and the first GDL component 21a, which will be described in more detail below while describing the control unit 80.

The light emitting unit 33 may emit the light in a direction where the MEA 11 and the first GDL component 21a are stacked above the test table 31. According to the present disclosure, the light emitting unit 33 may be provided in the first robot 22a. The light emitting unit 33 is disposed below an arm of the first robot 22a so as to vertically emit the light toward the test table 31 while moving the MEA 11 and the first GDL component 21a which are gripped by the first robot 22a. The light emitting unit 33 is not necessarily limited to being provided in the first robot 22a, and may be provided above the test table 31.

The light which is emitted from the light emitting unit 33 may pass through the MEA 11 and the first GDL component 21a to be received by the light receiving unit 35.

The light receiving unit 35 is provided in the test table 31 to receive the light which sequentially passes the MEA 11 and the first GDL component 21a, as described above. That is, the light receiving unit 35 may be disposed on the test table 31 below a vertical line of a position where the MEA 11 and the first GDL component 21a are securely disposed. As described above, the light receiving unit 35 is disposed below the vertical line of the position where the MEA 11 and the first GDL component 21a are securely disposed in order to easily check whether there is an error in a stacked status of the MEA 11 and the first GDL component 21a, which will be described in more detail below while describing the control unit 80.

A plurality of light receiving units 35 may be provided to receive the light inside the test table 31. That is, the plurality of light receiving units 35 may be provided at equal intervals corresponding to an area of a portion in the test table 31 where the MEA 11 and the GDL component 21 are securely disposed. Accordingly, the light receiving unit 35 may sense a status when the light emitted from the light emitting unit 33 passes through the MEA 11 and the GDL component 21 to transmit a sensed signal to the control unit 80.

The light receiving unit 35 may include a sensor case 35a which is provided on the test table 31, a photo sensor 35b which is disposed inside the sensor case 35a, and a sensor line 35c which is provided in the sensor case 35a so as to transmit a sensed signal of the photo sensor 35b.

An installation space is formed in the sensor case 35a, and the sensor case 35a may be disposed on the test table 31. A screw thread may be formed on an exterior circumference of the sensor case 35a to be fixed to the test table 31.

The photo sensor 35b is provided in the sensor case 35a and fixed by a chip holder 35d. A configuration of the photo sensor 35b is known so that more specific description thereof will be omitted. As described above, the signal sensed by the photo sensor 35b may be transmitted to the control unit 80 through the sensor line 35c.

The controller 37 may be configured to receive the signal sensed by the photo sensor 35b to transmit the signal to the control unit 80. Such a controller 37 may transmit the signal sensed by the photo sensor 35b to the control unit 80 through wired or wireless communication. Further, the controller 37 may selectively control the operation of the light emitting unit 33. That is, after checking that the MEA 11 and the GDL component 21 are securely disposed in the test table 31, the controller 37 may selectively control the operation of the light emitting unit 33.

The second test unit 50 may be provided between the hot press 40 and the second robot 22b. That is, the second test unit 50 may be provided so as to check whether the stacked status of the second GDL components 21b which are stacked above the MEA 11 and the first GDL component 21a is normal.

The second test unit 50 may be configured to have a configuration corresponding to that of the first test unit 30. That is, the second test unit 50 has the same configuration as the first test unit 30, but an installation position thereof is different from that of the first test unit 30 and is provided to check a stacked status of the second GDL component 21b. That is, when the second GDL components 21b are disposed on the feeding test units 30 and 50 by the transfer robot 22, the second test unit 50 checks whether the second GDL components 21b are correctly stacked. As described above, the stacked status in the second test unit 50 is checked by the control unit 80, which will be described in more detail while describing the control unit 80 below.

The MEA 11 and the GDL components 21 may be transferred by the transfer robot 22.

The transfer robot 22 may include the first robot 22a which picks up the MEA 11 of the MEA supply unit 10 and the GDL component 21 of the GDL supply unit 20 to insert the MEA 11 and the GDL component 21 into a working region of the hot press 40. The second robot 22b picks up the integrated component, which is treated in the hot press 40, to transfer to the trimming press 60.

The first robot 22a is disposed between the MEA supply unit 10 and the hot press 40 to insert the MEA 11 and the first GDL component 21a in the hot press 40 and to transfer in order to test the MEA 11 and the first GDL component 21a through an alignment test unit 90 before insertion. According to an embodiment of the present inventive concept, the alignment test unit 90 includes length direction alignment test members 91 and width direction alignment test members 93. The length direction alignment test members 91 test a length directional alignment, and each short edge is provided with the width direction alignment test member 93. Each of long edges has a pair of the width direction alignment test members 93, and thereby, a width directional alignment and a rotational alignment may be tested.

The second robot 22b is disposed between the hot press 40 and the trimming press 60, and transfers the second GDL components 21b above the stacked MEA 11 and first GDL component 21a and transfers the integrated component pressed in the hot press 40 to the trimming press 60.

The trimming press 60 cuts the integrated component in which the MEA 11 and the GDL component 21 are stacked to have a predetermined size, and is known so a description thereof will be omitted.

The control unit 80 checks a received light amount through the controller 37 to determine whether there is an error in the stacked status of the MEA 11 and the GDL component 21, which will be described in more detail below.

First, the control unit 80 checks the received light amount of the plurality of light receiving units 35 through the controller 37. Then, the control unit 80 checks a value of the received light amount of the light receiving units 35 and measures values by the light receiving units 35 to form a linear graph.

Figure 5:
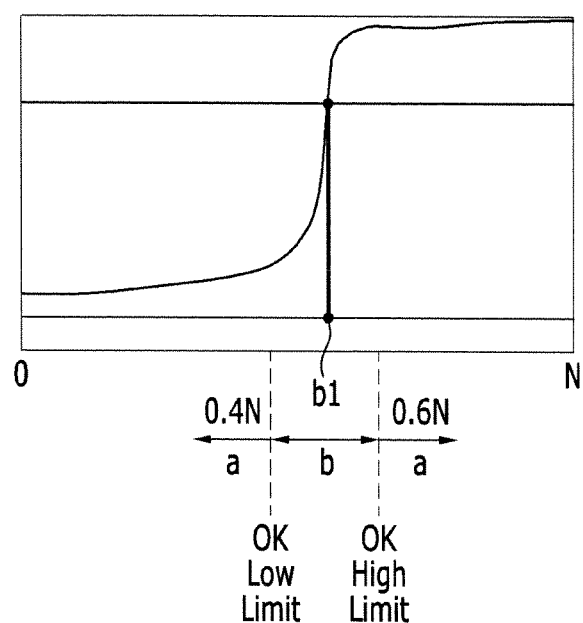
FIG. 5 is a view illustrating a graph of an amount of received light through a plurality of light receiving units.

FIG. 5 is a view illustrating a graph of an amount of received light through a plurality of light receiving units.

As illustrated in FIG. 5, an inflection point b1 at which a slope becomes infinity is checked by checking the slope of the linear graph. Here, when the MEA 11 and the GDL component 21 are not provided or are closer to N (toward the right in the graph), light emitted from the light emitting unit 33 may be maximally received and passes through the inflection point b1 by a steep slope, and the light is hardly received because materials of the MEA 11 and the GDL component 21 block the light.

As a result, in a region b including the steep slope, the inflection point b1 refers to an edge B of the stacked status of the MEA 11 and the GDL component 21 (see FIG. 2).

A position of the photo sensor 35b which outputs a received light amount signal is checked in a position of the inflection.

Next, a vertical position, in which the photo sensor 35b is provided, is set as the edge B where the MEA 11 and the GDL component 21 are stacked.

When the edge B is out of a predetermined range b, it is determined that the MEA 11 and the GDL component 21 are erroneously stacked so that an error signal is output. That is, the received light amount sensed by the light receiving unit 35 is varied in the edge B of the erroneously stacked portion so that it is possible to easily determine whether the MEA 11 and the GDL component 21 are normally stacked.

Figure 6:
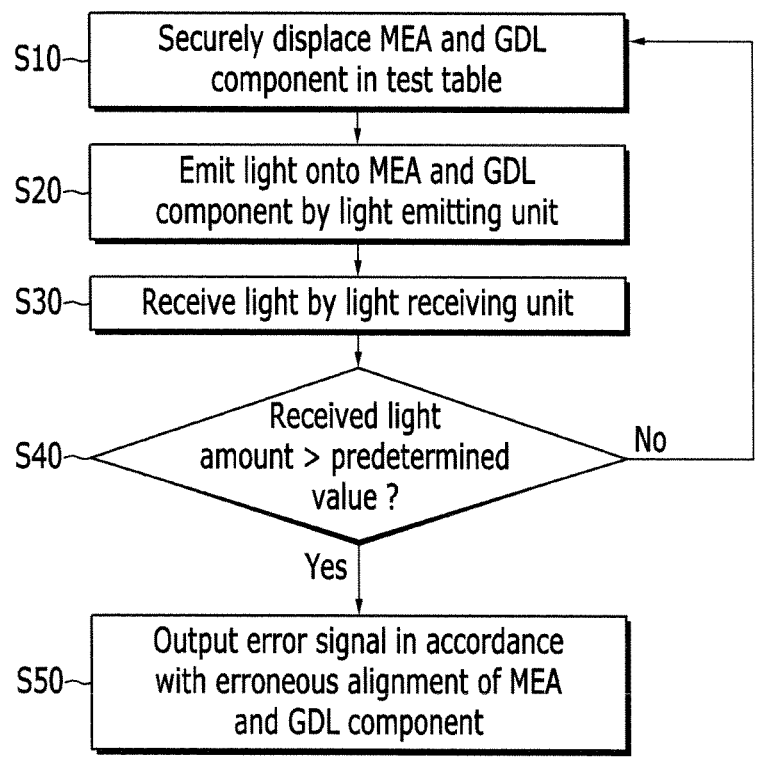
FIG. 6 is a flowchart schematically illustrating a method for testing feeding of a fuel cell stack according to an exemplary embodiment of the present inventive concept.
Figure 7:
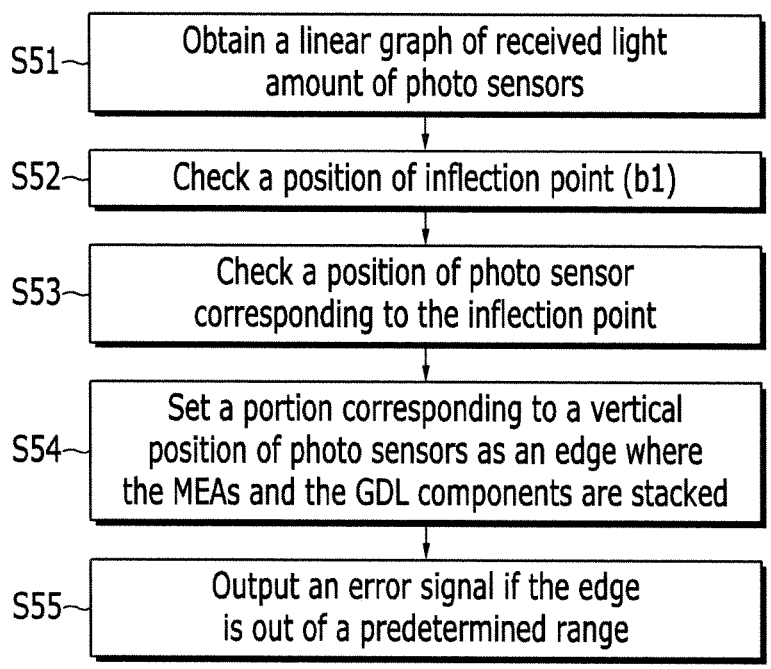
FIG. 7 is a flowchart illustrating the step S50 outputting of an error signal by an erroneous alignment position, according to an exemplary embodiment of the present inventive concept.

FIG. 6 is a flowchart schematically illustrating a method for testing feeding of a fuel cell stack according to an exemplary embodiment of the present inventive concept. The same reference numerals as in FIGS. 1 to 5 denote the same components having the same functions. Hereinafter, the reference numerals will not be described in detail. A method for testing alignment of a fuel cell stack will now be described in detail.

MEAs 11 and GDL components 21 which configure a fuel cell stack are securely disposed and aligned in a secure displacement unit D set in a test table 31 in step S10.

In step S20, light is emitted from the light emitting unit 33 which is disposed above the alignment of the MEAs 11 and the GDL components 21.

Subsequently, the light which passes through the MEAs 11 and the GDL components 21 in step S20 is received by the light receiving unit 35 in step S30. Here, as the light receiving unit 35, a plurality of photo sensors 35b may be provided along an edge of the secure displacement unit D.

Then, it is determined whether a received light amount is out of a predetermined value in step S40 by checking the received light amount of the light received in step S30.

If it is determined that the received light amount is out of the predetermined value, the receiving unit 35 checks a position where the received light amount is erroneously received and an erroneous alignment position of the MEAs 11 and the GDL components 21 to output an error signal in step S50.

Step S50 will be more specifically described hereinafter.

The received light amount of the photo sensors 35b are illustrated as a linear graph in step S51. That is, as illustrated in FIG. 5, intensity of light received by the plurality of photo sensors 35b is input, and portions corresponding to the intensities of the light are connected to be illustrated as the linear graph.

A slope of the linear graph is checked in step S51, and a position of an inflection point where the slope becomes infinity is checked in step S52.

Next, a position of the photo sensor 35b corresponding to the infection point b1 is checked in step S53.

A portion corresponding to a vertical position where the photo sensors 35b in step S53 are disposed is set as an edge where the MEAs 11 and the GDL components 21 are stacked in step S54.

If the edge is out of a predetermined range in step S54, it is determined whether the MEAs 11 and the GDL components 21 are erroneously stacked and an error signal is output in step S55.

As described above, steps S51 to S54 are performed so that an erroneously alignment of the MEAs 11 and the GDL components 21 are correctly checked to promptly measure to improve efficiency for producing a fuel cell stack and production quality.

The exemplary embodiments of the present inventive concept have been described above with reference to the drawings. While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method of producing a fuel cell stack, the method comprising steps of:
   aligning by securely disposing an MEA and a GDL component of the fuel cell stack in a secure displacement unit set on a test table;
   emitting light through a light emitting unit disposed above the alignment of the MEA and the GDL component;
   receiving the light which passes through the MEA and the GDL component through a plurality of light receiving units;
   checking a received light amount received to determine whether the received light amount is out of a predetermined value; and
   determining a position of each of the light receiving units where the light is erroneously received to check the erroneous alignment of the MEA and the GDL component when it is determined that the received light amount is out of the predetermined value and outputting an error signal,
   wherein the step of determining includes:
   plotting a linear graph using the received light amounts of a plurality of photo sensors;
   checking a slope of the linear graph to determine an inflection point where the slope becomes infinity;
   checking a position of the photo sensors corresponding to a position of the inflection point;
   setting a portion where the photo sensors are disposed vertically as an edge where the MEAs and the GDL components are stacked; and
   outputting an error signal if the MEA and the GDL component are erroneously stacked when the edge is out of a predetermined range, and
   wherein the light receiving units are spaced apart from each other in a uniform distance and receive different intensity of light due to difference in transmittance of light passing though the MEA, the GDL component, and the edge.

2. The method of claim 1, wherein
the photo sensors are disposed along an edge of the secure displacement unit.

* * * * *